(12) United States Patent
Shimojo et al.

(10) Patent No.: US 9,334,822 B2
(45) Date of Patent: May 10, 2016

(54) PURIFICATION APPARATUS OF ENGINE EXHAUST GAS AND METHOD FOR PURIFICATION OF EXHAUST GAS

(71) Applicant: NISSAN MOTOR CO., LTD., Yokohama-shi (JP)

(72) Inventors: Shigemasa Shimojo, Atsugi (JP); Masayuki Tani, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/411,006

(22) PCT Filed: Apr. 26, 2013

(86) PCT No.: PCT/JP2013/062392
§ 371 (c)(1),
(2) Date: Dec. 23, 2014

(87) PCT Pub. No.: WO2014/002604
PCT Pub. Date: Jan. 3, 2014

(65) Prior Publication Data
US 2015/0204260 A1 Jul. 23, 2015

(30) Foreign Application Priority Data
Jun. 25, 2012 (JP) ................................. 2012-142142

(51) Int. Cl.
*F01N 3/20* (2006.01)
*F02D 41/14* (2006.01)
(Continued)

(52) U.S. Cl.
CPC .............. *F02D 41/1445* (2013.01); *F01N 3/20* (2013.01); *F02D 41/0295* (2013.01);
(Continued)

(58) Field of Classification Search
CPC ... F01N 3/0864; F01N 3/101; F01N 2430/06; F01N 2560/025; F01N 2560/14; F01N 2900/0408; F01N 2900/1402; F02D 35/0092; F02D 41/0295; F02D 41/1408; F02D 41/1454; F02D 41/1475; F02D 2200/0814; F02D 2250/32; Y02T 10/22; Y02T 10/44
USPC .......................... 60/274, 276, 277, 285, 299
See application file for complete search history.

(56) References Cited

U.S. PATENT DOCUMENTS 8,464,522 B2 6/2013 Fujiwara et al.
2001/0045089 A1* 11/2001 Kobayashi et al. ............. 60/274
(Continued)

FOREIGN PATENT DOCUMENTS

CN 101868607 A 10/2010
JP 2000-320375 A 11/2000
(Continued)

*Primary Examiner* — Jorge Leon, Jr.
(74) *Attorney, Agent, or Firm* — Foley & Lardner LLP (57) ABSTRACT

The first target A/F directing toward a richer side from the initial target A/F to the theoretical A/F is calculated; and the first estimated catalyst's oxygen amount is calculated based on the detected A/F and the theoretical A/F. Until the first estimated catalyst's oxygen amount reaches the first target catalyst's oxygen amount, calculations of the first target A/F and of the first estimated catalyst's oxygen amount continue. After the first estimated catalyst's oxygen amount reaches the first target catalyst's oxygen amount, the second target A/F directing toward a richer side from the theoretical A/F to the final target A/F is calculated; and the second estimated catalyst's oxygen amount is calculated based on the detected A/F and the final target A/F. Until the second estimated catalyst's oxygen amount reaches the second target catalyst's oxygen amount, calculations of the second target A/F and of the second estimated catalyst's oxygen amount continue.

11 Claims, 6 Drawing Sheets (51) Int. Cl.
*F02D 41/02* (2006.01)
*F02D 35/00* (2006.01)
*F01N 3/08* (2006.01)
*B01D 53/94* (2006.01)
*F01N 3/10* (2006.01)
*F01N 13/00* (2010.01)
*F02D 41/18* (2006.01)

(52) U.S. Cl.
CPC ....... F02D 41/1441 (2013.01); F02D 41/1454 (2013.01); F02D 41/1456 (2013.01); *B01D 53/944* (2013.01); *B01D 2255/908* (2013.01); *F01N 3/0864* (2013.01); *F01N 3/101* (2013.01); *F01N 13/0093* (2014.06); *F01N 2430/06* (2013.01); *F01N 2560/025* (2013.01); *F01N 2560/14* (2013.01); *F01N 2900/0408* (2013.01); *F01N 2900/1402* (2013.01); *F02D 35/0092* (2013.01); *F02D 41/1408* (2013.01); *F02D 41/1475* (2013.01); *F02D 41/182* (2013.01); *F02D 2200/0814* (2013.01); *F02D 2200/0816* (2013.01); *F02D 2250/32* (2013.01); *Y02T 10/22* (2013.01); *Y02T 10/44* (2013.01)

(56) References Cited

U.S. PATENT DOCUMENTS

| | | | |
|---|---|---|---|
| 2002/0040577 A1* | 4/2002 | Kamoto et al. | 60/277 |
| 2002/0157379 A1 | 10/2002 | Kakuyama et al. | |
| 2002/0157380 A1* | 10/2002 | Kakuyama et al. | 60/276 |
| 2002/0194840 A1* | 12/2002 | Kako et al. | 60/285 |
| 2003/0019485 A1* | 1/2003 | Kobayashi et al. | 123/672 |
| 2003/0159434 A1* | 8/2003 | Ikemoto et al. | 60/285 |
| 2010/0192543 A1 | 8/2010 | Fujiwara et al. | |
| 2011/0179774 A1* | 7/2011 | Iihoshi et al. | 60/276 |
| 2012/0227385 A1* | 9/2012 | Yoshioka | 60/285 |
| 2013/0340410 A1* | 12/2013 | Suzuki et al. | 60/285 |

FOREIGN PATENT DOCUMENTS

| | | |
|---|---|---|
| JP | 2003-065038 A | 3/2003 |
| JP | 2004-116295 A | 4/2004 |
| JP | 2005-127259 A | 5/2005 |
| WO | WO 2011048707 A1 * | 4/2011 |

* cited by examiner

PURIFICATION APPARATUS OF ENGINE EXHAUST GAS AND METHOD FOR PURIFICATION OF EXHAUST GAS

TECHNICAL FIELD

The present invention relates to a purification apparatus of an exhaust gas of an engine and to a method for purifying an exhaust gas; specifically, the present invention relates to a catalyst having an oxygen holding capacity with which an oxygen in an exhaust gas discharged from an engine is held or released in accordance with an air fuel ratio in the exhaust gas.

BACKGROUND ART

In JP2003-65038A, the air fuel ratio is controlled such that the oxygen holding amount of the catalyst may become a target catalyst's oxygen holding amount.

SUMMARY OF INVENTION

In JP2003-65038A, when an output of a downstream O2 sensor becomes more than a prescribed threshold in a rich side (or to a lean side), an estimated catalyst's oxygen holding amount is changed to a minimum catalyst's oxygen holding amount (or a maximum catalyst's oxygen holding amount), that is, the estimated catalyst's oxygen holding amount is corrected.

However, even though there is an error in the air fuel ratio in the upstream air fuel ratio sensor, if the output of the downstream O2 sensor is within a prescribed threshold, the estimated catalyst's oxygen holding amount is not corrected. That the estimated catalyst's oxygen holding amount is not corrected means that a discrepancy is generated between the estimated catalyst's oxygen holding amount and the actual catalyst's oxygen holding amount. Because of this discrepancy, the catalyst's performance in purification of an exhaust gas continues in the state of a low level.

Accordingly, an object of the present invention is to provide an apparatus that can control the air fuel ratio in the exhaust gas in a region in which the catalyst's performance in purification of the exhaust gas is not deteriorated.

According to an embodiment of the present invention, a purification apparatus of an exhaust gas of an engine comprises a catalyst having an oxygen holding capacity with which an oxygen in the exhaust gas discharged from the engine is held or released in accordance with an air fuel ratio in the exhaust gas, an upstream air fuel ratio detecting unit adapted to detect an air fuel ratio of the exhaust gas in an upstream side of the catalyst, and a downstream air fuel ratio detecting unit adapted to detect an air fuel ratio of the exhaust gas in a downstream side of the catalyst.

Furthermore, this purification apparatus of an exhaust gas includes a first target air fuel ratio calculating unit adapted to calculate, when the downstream air fuel ratio detecting unit judges a rich side of a theoretical air fuel ratio, wherein a value in a lean side of the theoretical air fuel ratio is taken as an initial target air fuel ratio, a first target air fuel ratio directing toward a richer side from the initial target air fuel ratio to the theoretical air fuel ratio based on a first target catalyst's oxygen holding amount and a first estimated catalyst's oxygen holding amount, a first fuel-supply-amount-correcting unit adapted to correct a fuel supply amount to the engine thereby obtaining the first target air fuel ratio, a first estimated catalyst's oxygen holding amount calculating unit adapted to calculate, when a target air fuel ratio is the first target air fuel ratio, the first estimated catalyst's oxygen holding amount based on an air fuel ratio that is detected by the upstream air fuel ratio detecting unit and the theoretical air fuel ratio, a first calculation continuing unit dedicated to continue calculation of the first target air fuel ratio and the first estimated catalyst's oxygen holding amount until the first estimated catalyst's oxygen holding amount reaches the first target catalyst's oxygen holding amount, a second target air fuel ratio calculating unit dedicated to calculate, after the first estimated catalyst's oxygen holding amount reaches the first target catalyst's oxygen holding amount, wherein a value in a rich side of the theoretical air fuel ratio is taken as a final target air fuel ratio, a second target air fuel ratio directing toward a richer side from the theoretical air fuel ratio to the final target air fuel ratio based on a second target catalyst's oxygen holding amount and a second estimated catalyst's oxygen holding amount, a second fuel-supply-amount-correcting unit dedicated to correct a fuel supply amount to the engine thereby obtaining the second target air fuel ratio, a second estimated catalyst's oxygen holding amount calculating unit dedicated to calculate, when the target air fuel ratio is the second target air fuel ratio, the second estimated catalyst's oxygen holding amount based on an air fuel ratio that is detected by the upstream air fuel ratio detecting unit and the theoretical air fuel ratio, and a second calculation continuing unit dedicated to continue calculations of the second target air fuel ratio and of the second estimated catalyst's oxygen holding amount until the second estimated catalyst's oxygen holding amount reaches the second target catalyst's oxygen holding amount.

Embodiments of the present invention and advantages of the present invention will be explained in detail as following with referring to the attached drawings.

DESCRIPTION OF EMBODIMENTS

Figure 1:
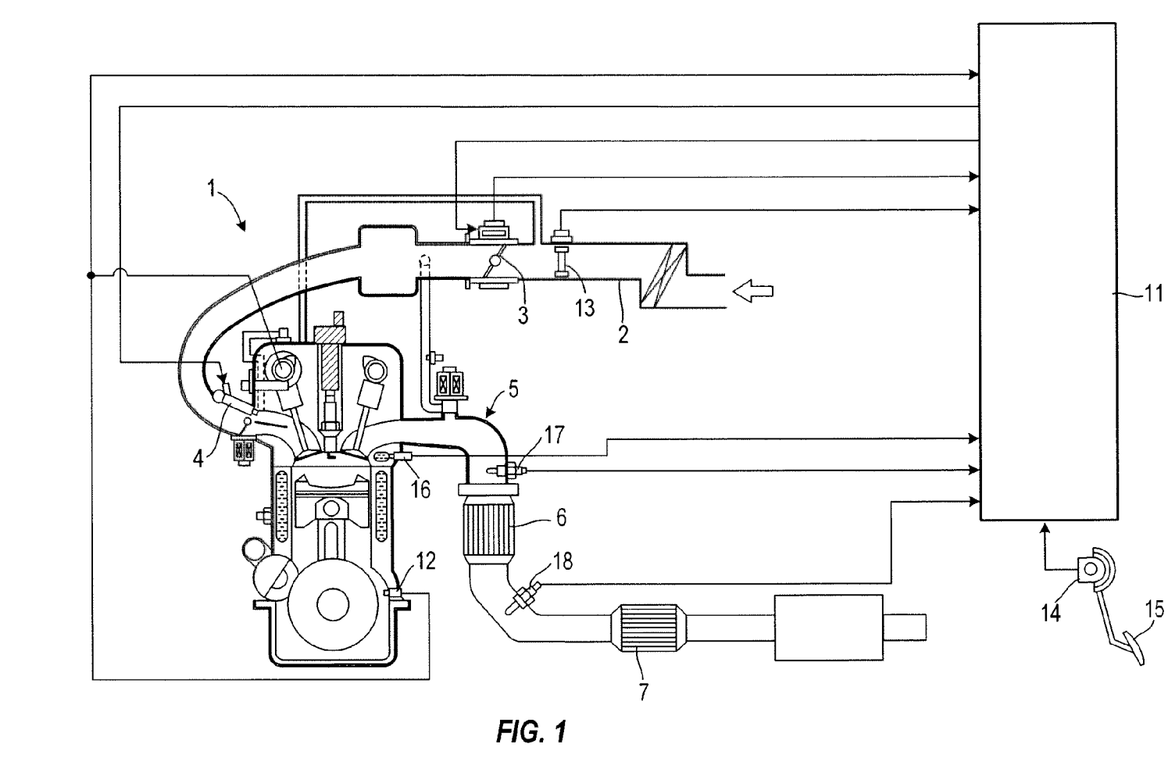
FIG. 1 is a schematic configuration drawing of the purification apparatus of an exhaust gas of an engine according to an embodiment of the present invention.

FIG. 1 shows a schematic configuration of the purification apparatus of the exhaust gas of the engine 1. The engine 1 comprises the intake passage 2, the throttle valve 3, and the fuel injection valve 4. The fuel injection valve 4 supplies a fuel to an intake port by injection thereof so as to give a prescribed air fuel ratio by a fuel injection signal from the engine controller 11 in accordance with an operation condition.

The engine controller 11 receives signals that are sent from the crank angle sensor 12, the air flow meter 13, the accelerator sensor 14, and the water temperature sensor 16. The crank angle sensor 12 sends out a standard position signal and the unit angle signal of the crank angle. The air flow meter 13 sends out a signal of the intake air flow amount Qa. The accelerator sensor 14 sends out a signal of the depression amount (accelerator opening) of the acceleration pedal 15. The water temperature sensor 16 sends out a signal of the temperature of the engine cooling water.

In the engine controller 11, the basic injection pulse width Tp0 (ms) is calculated by the following equation from the engine rotation speed Ne that is detected by the crank angle sensor 12 and from the intake air flow amount Qa that is detected by the air flow meter 13.

$$Tp0 = K \times Qa/Ne \quad (1)$$

Here, K: constant value

If there is no detection error in the air flow meter 13 or the effect of variation of the flow characteristics in the fuel injection valve 4, in the steady state, an air fuel mixture having the theoretical air fuel ratio can be obtained by this basic injection pulse width Tp0. By using this basic injection pulse width Tp0, the pulse width Tp (ms) which corresponds to the cylinder air amount is calculated by the following equation.

$$Tp = Tp0 \times Fload + Tp(\text{previous}) \times (1 - Fload) \quad (2)$$

Here, Tp (previous): previous value of Tp
Fload: weighted average coefficient

In Equation (2), the air amount that flows into a cylinder (combustion chamber) is deemed to respond in a linearly delayed fashion to the air amount that flows through the air flow meter position during transition period (during acceleration or deceleration), whereby obtaining the air fuel mixture having the theoretical air fuel ratio even to this air amount that flows into the cylinder.

In the exhaust passage 5 of the engine 1, the catalysts 6 and 7 are arranged. The catalysts 6 and 7 are so-called three-way catalysts, wherein NOx, HC, and CO are purified at the maximum efficiency when the catalyst is in the atmosphere of the theoretical air fuel ratio. In more detail, a mixture of cerium (Ce) with a precious metal (catalyst) such as platinum (Pt), palladium (Pd), and rhodium (Rh) is supported on a honeycomb structure that is coated with alumina.

In the three-way catalyst, an oxygen in the exhaust gas is held (absorbed) by cerium under the condition that the air fuel ratio of the incoming exhaust gas is in the lean side of the theoretical air fuel ratio, whereby increasing the catalyst's oxygen holding amount. On the other hand, under the condition that the air fuel ratio of the incoming exhaust gas is in the rich side of the theoretical air fuel ratio, incoming components that are in the reduced state are oxidized by the oxygen held in the catalyst, whereby decreasing the catalyst's oxygen holding amount. In this way, the three-way catalyst has the function (oxygen holding capacity) to hold and release the oxygen in accordance with the air fuel ratio of the incoming exhaust gas.

In the upstream side of the catalyst 6 is installed the front air fuel ratio sensor 17 which has a linear characteristic; and in the downstream side of the catalyst 6 is installed the rear O2 sensor 18. The front air fuel ratio sensor 17 has a linear characteristic which responds to the oxygen concentration in the exhaust gas; and the rear O2 sensor 18 has a characteristic to be switched in a binary fashion at near the theoretical air fuel ratio.

In the engine controller 11, the air fuel ratio correction coefficient HOS (dimensionless quantity) is calculated based on the outputs of these sensors 17 and 18. By using this air fuel ratio correction coefficient HOS, the afore-mentioned pulse width Tp which corresponds to the cylinder air amount is corrected, that is, by using the following equation the fuel injection pulse width Ti (ms) during the time of the sequential injection is calculated.

$$Ti = Tp \times tFBYA \times HOS \times 2 + Ts \quad (3)$$

Here,
tFBYA: target equivalence ratio (dimensionless quantity)
HOS: air fuel ratio correction coefficient
Ts: ineffective injection pulse width (ms)

Then, when it comes to the prescribed fuel injection time, the fuel injection valve 4 installed in each cylinder opens by the time width which corresponds to this fuel injection pulse width Ti.

The target equivalence ratio tFBYA of the Equation (3) is a value around 1.0 as the center thereof; and when this value is 1.0, the air fuel mixture having the theoretical air fuel ratio is obtained. On the other hand, if this value is more than 1.0, the air fuel mixture in the rich side of the theoretical air fuel ratio is obtained, whereas if this value is a positive value which is less than 1.0, the air fuel mixture in the lean side of the theoretical air fuel ratio is obtained. In the present embodiment, tFBYA shall be 1.0.

Because of the detection error of the air flow meter 13 and by the effect of variation of the flow characteristics of the fuel injection valve 4, the air fuel mixture having the theoretical air fuel ratio cannot be obtained thereby leading the air fuel ratio of the exhaust gas to the rich side or the lean side of the theoretical air fuel ratio; however, this is not considered here. In other words, it is considered that there is no detection error in the air flow meter 13 or variation in the flow characteristics of the fuel injection valve 4. Content of the air fuel ratio correction coefficient HOS of the equation (3) is newly introduced in the present embodiment; and a detail explanation thereof will be given later.

By the way, the conventional way used to control the air fuel ratio in the engine 1 having the catalyst 6 can be explained as follows; that is, the oxygen holding amount of the catalyst 6 is estimated, whereby the air fuel ratio of the exhaust gas is controlled so as to coincide this estimated catalyst's oxygen holding amount with a target value of the catalyst's oxygen holding amount. Hereinafter, the oxygen holding amount of the catalyst 6 is called as "catalyst's oxygen holding amount", the estimated value of the catalyst's oxygen holding amount as "estimated catalyst's oxygen holding amount", and the target value of the catalyst's oxygen holding amount as "target catalyst's oxygen holding amount".

Conventionally, contents of control of the air fuel ratio are flowing (1) to (4). In order not to be dependent on the volume of the catalyst 6, the catalyst's oxygen holding amount is expressed in terms of %, wherein the maximum catalyst's oxygen holding amount is taken as 100%, and the minimum catalyst's oxygen holding amount is taken as 0%.

(1) The target catalyst's oxygen holding amount is set at ½ (=50%) between the maximum catalyst's oxygen holding amount (=100%) and the minimum catalyst's oxygen holding amount (=0%), wherein the air fuel ratio of the exhaust gas is controlled in such a way that the estimated catalyst's oxygen holding amount may become the target catalyst's oxygen holding amount.

(2) The estimated catalyst's oxygen holding amount is calculated from the difference between the theoretical air fuel ratio and the air fuel ratio at the inlet port of the catalyst 6 that is detected by the front air fuel ratio sensor 17, the exhaust gas flow amount Qexh, and the excess or deficient oxygen concentration FO2 in the exhaust gas.

(3) When output of the rear O2 sensor 18 exceeds a predetermined threshold in the rich side (or the lean side), the estimated catalyst's oxygen holding amount is reset at the minimum catalyst's oxygen holding amount (or the maximum catalyst's oxygen holding amount). That is, the estimated catalyst's oxygen holding amount is corrected.

(4) After this, control of the air fuel ratio shown in (1) to (3) is carried out again.

However, in the conventional way to control the air fuel ratio, when output of the rear O2 sensor 18 is within the range between the predetermined threshold in the rich side and the predetermined threshold in the lean side in spite that there is an error in the air fuel ratio in the front air fuel ratio sensor 17, the estimated catalyst's oxygen holding amount is not corrected. That the estimated catalyst's oxygen holding amount is not corrected means that a discrepancy is generated between the estimated catalyst's oxygen holding amount and the actual catalyst's oxygen holding amount.

Because of this discrepancy, the state that the exhaust gas cleaning performance of the catalyst 6 is low continues. For example, when the actual catalyst's oxygen holding amount becomes 0% whereby leading to the deficient state of oxygen to oxidize HC and CO in the exhaust gas, it is necessary to let the catalyst 6 take in oxygen by directing the air fuel ratio of the exhaust gas toward the lean side. At this time, unless the estimated catalyst's oxygen holding amount is 0%, the air fuel ratio of the exhaust gas cannot be directed toward the lean side so that HC and CO in the exhaust gas cannot be oxidized by the catalyst 6.

On the other hand, when the actual catalyst's oxygen holding amount becomes 100% whereby leading to the state in which an oxygen cannot be taken out from NOx in the exhaust gas, it is necessary to let the catalyst 6 release an oxygen by directing the air fuel ratio of the exhaust gas toward the rich side. At this time, unless the estimated catalyst's oxygen holding amount is 100%, the air fuel ratio of the exhaust gas cannot be directed toward the rich side so that NOx in the exhaust gas cannot be reduced by the catalyst 6.

Figure 2:
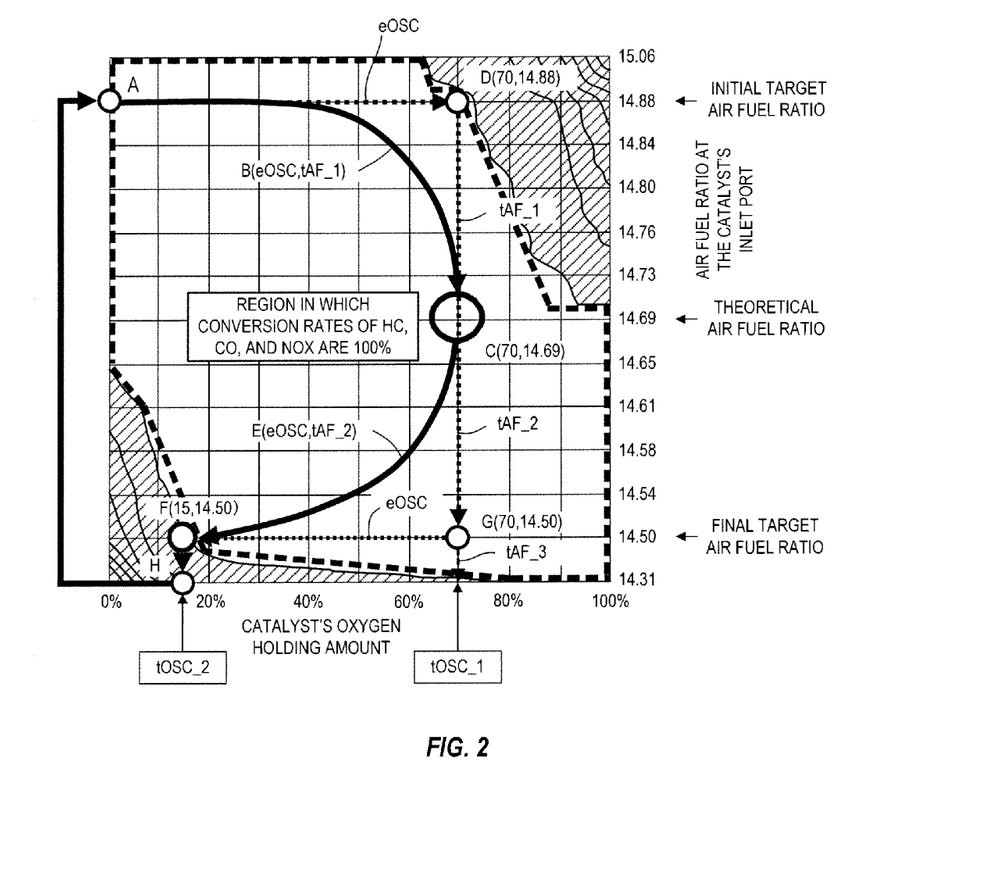
FIG. 2 is a characteristic chart of conversion rates of NOx, HC, and CO relative to the catalyst's oxygen holding amount and the air fuel ratio at the catalyst's inlet port.

In order to address these problems, inventors of the present invention carried out investigation; and how this was done will be explained by referring to FIG. 2. In FIG. 2, the region in which conversion rate of NOx is 100% and the region in which conversion rates of HC and CO become 100% are interposed on a plane wherein the catalyst's oxygen holding amount is shown in a horizontal axis and the air fuel ratio (air fuel ratio in the exhaust gas) at the inlet port of the catalyst 6 is shown in a vertical axis.

This shows that when the catalyst's oxygen holding amount in the horizontal axis is 0%, oxygen is not held at all in the catalyst 6, while when this value is 100%, the catalyst 6 cannot hold oxygen any more. The air fuel ratio at the catalyst's inlet port in the vertical axis is in the rich side (lower side in FIG. 2) till 14.31 and in the lean side (upper side in FIG. 2) till 15.06, with the center thereof being at the theoretical air fuel ratio (in this case 14.69).

In FIG. 2, the region in which the air fuel ratio at the catalyst's inlet port is in the rich side (lower side in FIG. 2) of the theoretical air fuel ratio of 14.69 and the catalyst's oxygen holding amount is near to 0% is hatched. This hatched region in the lower left is the region in which conversion rates of HC and CO are less than 100% (namely, the region in which all of HC and CO in the exhaust gas cannot be cleaned by oxidation). On the other hand, the region in which the air fuel ratio at the catalyst's inlet port is in the lean side (upper side in FIG. 2) of the theoretical air fuel ratio of 14.69 and the catalyst's oxygen holding amount is near to 100% is also hatched. This hatched region in the upper right is the region in which conversion rate of NOx is less than 100% (namely, the region in which all of NOx in the exhaust gas cannot be cleaned by reduction). Therefore, the rest region (region enclosed by the dashed line) other than these two hatched regions in the lower left and the upper right is the region in which conversion rates of HC, CO, and NOx become 100%.

Based on this cleaning characteristics of the exhaust gas of the catalyst 6 shown in FIG. 2, control of the air fuel ratio shown in following (1) to (5) shall be carried out in the present embodiment.

(1) By the output of the rear O2 sensor 18, when the air fuel ratio at the outlet port of the catalyst 6 (air fuel ratio in the exhaust gas) is judged in the rich side of the theoretical air fuel ratio of 14.69, the operation point is made to move in such a way that it starts from Point A and reaches Point C via the curved line B. Point A is the point which is determined by the catalyst's oxygen holding amount of 0% and the initial target air fuel ratio of 14.88 (air fuel ratio in the lean side of the theoretical air fuel ratio); and the control starts with the lean air fuel ratio. Point C is the point which is determined by the theoretical air fuel ratio of 14.69 and the maximum value (=70%) of the catalyst's oxygen holding amount at which conversion rates of HC and CO can be kept at 100% with the initial target air fuel ratio of 14.88. Therefore, the air fuel ratio directing toward a richer side from the initial target air fuel ratio of 14.88 to the theoretical air fuel ratio of 14.69 is calculated as the first target air fuel ratio tAF_1. In this case, by taking the catalyst's oxygen holding amount of 70% at Point C as the first target catalyst's oxygen holding amount tOSC_1, the changing rate of the first target air fuel ratio tAF_1 toward a richer side is determined based on the difference between the first target catalyst's oxygen holding amount tOSC_1 and the estimated catalyst's oxygen holding amount eOSC (first catalyst's oxygen holding amount).

Further, the estimated catalyst's oxygen holding amount eOSC (first catalyst's oxygen holding amount) that is used to calculate the first target air fuel ratio is calculated based on the difference between the theoretical air fuel ratio of 14.69 and the air fuel ratio rAF at the catalyst's inlet port that is detected by the front air fuel ratio sensor 17.

(2) Next, the operation point is made to move from Point C to Point F via the curved line E. Point F is the point which is determined by the final target air fuel ratio of 14.50 (air fuel ratio in the rich side of the theoretical air fuel ratio) and the minimum value (=15%) of the catalyst's oxygen holding amount with which conversion rate of NOx can be kept at 100% with the final target air fuel ratio of 14.50; and the operation is terminated at the rich air fuel ratio. Therefore, the air fuel ratio directed toward a richer side from the theoretical air fuel ratio of 14.69 to the final target air fuel ratio of 14.50 is calculated as the second target air fuel ratio tAF_2. In this case, by taking the catalyst's oxygen holding amount 15% of Point F as the second target catalyst's oxygen holding amount tOSC_2, the changing rate of the second target air fuel ratio tAF_2 toward a richer side is determined based on the difference between this second target catalyst's oxygen holding amount tOSC_2 and the estimated catalyst's oxygen holding amount eOSC (second catalyst's oxygen holding amount).

Further, the estimated catalyst's oxygen holding amount eOSC (second catalyst's oxygen holding amount) that is used to calculate the second target air fuel ratio is calculated based on the difference between the theoretical air fuel ratio of 14.69 and the air fuel ratio rAF at the catalyst's inlet port that is detected by the front air fuel ratio sensor 17.

The final target air fuel ratio is given by the air fuel ratio obtained by subtracting the difference (0.19) between the initial target air fuel ratio of 14.88 and the theoretical air fuel ratio of 14.69 from the theoretical air fuel ratio of 14.69. That is, the changing width of the first target air fuel ratio tArF_1 changed in the lean side of the theoretical air fuel ratio of 14.69 is made to be the same as the changing width of the second target air fuel ratio tArF_2 changed in the rich side of the theoretical air fuel ratio of 14.69.

(3) Next, the operation point is made to direct further toward a richer side from Point F. And, the air fuel ratio at the outlet port of the catalyst 6 is made to be judged in the rich side of the theoretical air fuel ratio of 14.69 by the output of the rear O2 sensor 18. Therefore, the air fuel ratio directed toward a richer side from the final target air fuel ratio of 14.50 to Point H is calculated as the third air fuel ratio tAF_3. In this case, the third target air fuel ratio tAF_3 is made to change at a faster rate than the rate of the first target air fuel ratio tAF_1.

(4) By comparing the output of the rear O2 sensor 18 and the slice level, when the output of the rear O2 sensor becomes smaller by passing over the slice level, the air fuel ratio at the outlet port of the catalyst 6 is judged to be in the rich side of the theoretical air fuel ratio.

(5) Then, the operation returns to (1), whereby carrying out operations (2) and (3) again, which is followed by (4).

As seen in the above, as one control cycle, the operation point is moved from Point A, to Point C, and then to Point F in the plane of the catalyst's oxygen holding amount and the air fuel ratio at the catalyst's inlet port as well as in the region in which the respective conversion rates of HC, CO, and NOx are 100%; and this cycle operation is repeated. The curve B is the track of the point which is determined by the estimated catalyst's oxygen holding amount eOSC and the first target air fuel ratio tAF_1. The curve E is the track of the point which is determined by the estimated catalyst's oxygen holding amount eOSC and the second target air fuel ratio tAF_2.

If there is an error in the front air fuel ratio sensor 17, an error is also generated in the estimated catalyst's oxygen holding amount that is calculated based on the air fuel ratio in the exhaust gas that is detected by the front air fuel ratio sensor 17. Therefore, if the chance to correct the estimated catalyst's oxygen holding amount that is described in (3) does not appear readily, it causes significant deviation of the estimated catalyst's oxygen holding amount from the actual catalyst's oxygen holding amount. As mentioned above, the situation that the cleaning performance of the catalyst 6 as to the exhaust gas is deteriorated by this discrepancy continues.

On the other hand, in the present embodiment, the operation point is moved from Point F toward a richer side once, and after the air fuel ratio at the outlet port of the catalyst 6 is made to be judged in the rich side of the theoretical air fuel ratio by the output of the rear O2 sensor 18, operation is moved back to Point A. By so doing, the estimated catalyst's oxygen holding amount eOSC can be corrected in every cycle. In the present embodiment, the estimated catalyst's oxygen holding amount eOSC does not deviate largely from the actual catalyst's oxygen holding amount; and thus, continuation of the situation that the cleaning performance of the catalyst 6 as to the exhaust gas is deteriorated by the discrepancy can be avoided.

The control method of the air fuel ratio is not limited to the case of FIG. 2. For example, the changing width of the first target air fuel ratio tArF_1 changed in the lean side of the theoretical air fuel ratio of 14.69 may be different from the changing width of the second target air fuel ratio tArF_2 changed in the rich side of the theoretical air fuel ratio of 14.69.

In addition, the initial target air fuel ratio is not limited to 14.88, and the final target air fuel ratio is not limited to 14.50, so that they may be larger or smaller than these values. For example, the initial target air fuel ratio of 14.84 may be selected. In this case, the maximum value of the catalyst's oxygen holding amount with which conversion rate of NOx can be kept at 100% with the initial target air fuel ratio of 14.84 becomes 75%, so that the first target catalyst's oxygen holding amount tOSC_1 may be set at 75%. In addition, for example, the final target air fuel ratio of 14.54 may be selected. In this case, the minimum value of the catalyst's oxygen holding amount with which conversion rates of HC and CO can be kept at 100% with the final target air fuel ratio of 14.54 becomes about 15%, so that the second target catalyst's oxygen holding amount tOSC_2 may be set at 15%.

Figure 3:
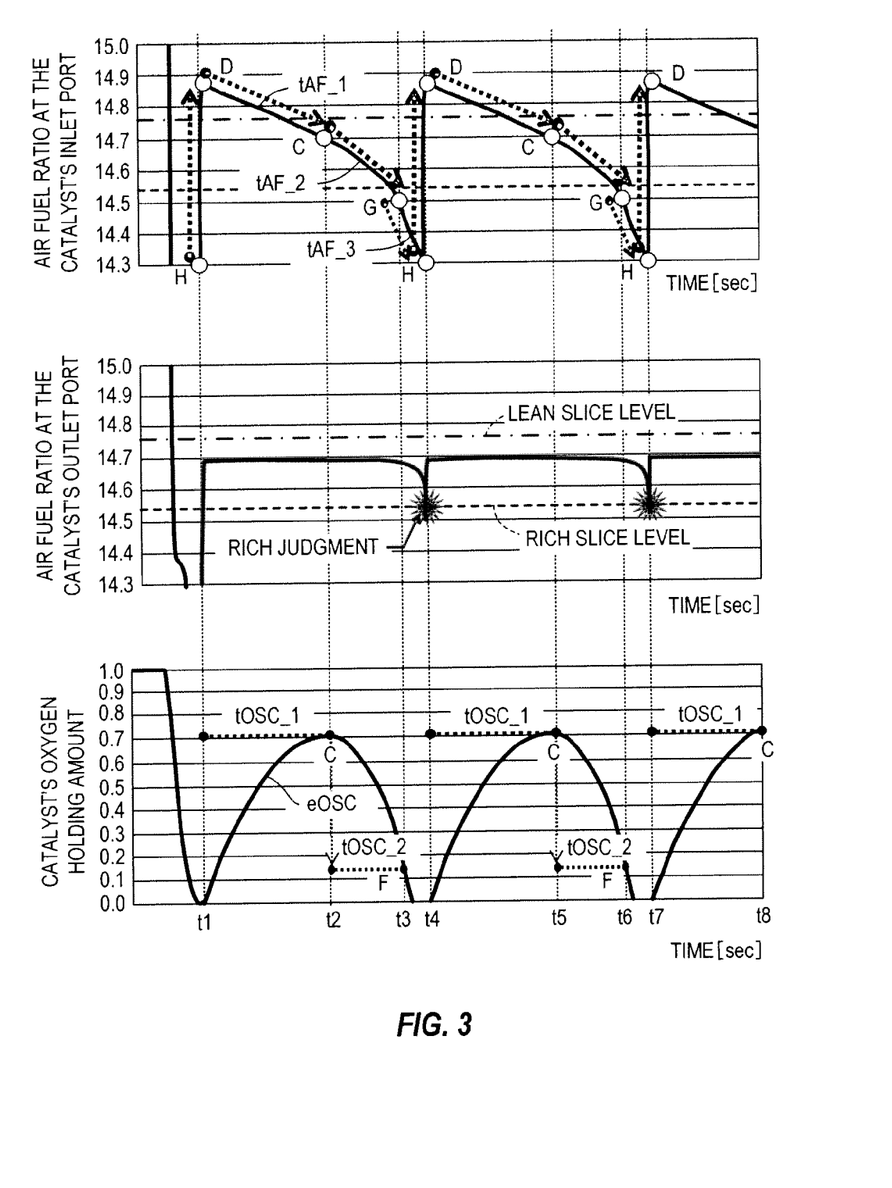
FIG. 3 shows the timing charts each showing the change of the air fuel ratio at the catalyst's inlet port, the air fuel ratio at the catalyst's outlet port, and the catalyst's oxygen holding amount, respectively.

Based on the idea of controlling the air fuel ratio shown in FIG. 2, the model to show how the air fuel ratio at the inlet port of the catalyst 6, the air fuel ratio at the outlet port of the catalyst 6, and the catalyst's oxygen holding amount change may be depicted in FIG. 3.

In the upper column of FIG. 3, Point H, Point D, Point C, and Point G each corresponds to Point H, Point D, Point C, and Point G in FIG. 2, respectively. As shown in the upper column of FIG. 3, the control is started at the timing of t1 with setting the initial target air fuel ratio of 14.88. The first target air fuel ratio tAF_1 which becomes gradually richer from the initial target air fuel ratio of 14.88 to the theoretical air fuel ratio of 14.69 is calculated. From the timing of t2, the second target air fuel ratio tAF_2 which becomes gradually richer from the theoretical air fuel ratio of 14.69 to the final target air fuel ratio of 14.50 is calculated. From the timing of t3, the third target air fuel ratio tAF_3 is calculated as the air fuel ratio directing toward a richer side than the final target air fuel ratio of 14.50. From the timing of t4, the above operation is repeated.

In the middle column of FIG. 3, the air fuel ratio at the outlet port of the catalyst 6 is detected by an air fuel ratio sensor which has a linear characteristic, not by the rear O2 sensor 18. Therefore, in the middle column of FIG. 3, the rich judgment is made when the air fuel ratio at the outlet port of the catalyst 6 passes over the rich slice level (this is between 14.5 and 14.6) by the third target air fuel ratio tAF_3 at the timing of t4 in the course of directing toward a richer side. On the other hand, in FIG. 2, the scenario is set so as to make the rich judgment by the output of the rear O2 sensor 18 in the course of the operation point directing toward a smaller side (richer side) than the final target air fuel ratio of 14.50; and thus, FIG. 2 and the middle column of FIG. 3 do not necessarily match with each other. As shown in the middle column of FIG. 3, when the rich judgment is made at the timing of t4, as shown in the upper column of FIG. 3, immediately after the timing of t4, the initial target air fuel ratio of 14.88 is set to restart the control.

As shown in the lower column of FIG. 3, in the present embodiment, the first target catalyst's oxygen holding amount tOSC_1 is set at 70%, and the second target catalyst's oxygen holding amount tOSC_2 is set at 15%; namely these two target values are set. After the estimated catalyst's oxygen holding amount eOSC is set at 0% as the initial setting at the timing of t1, firstly the estimated catalyst's oxygen holding amount eOSC increases toward the first target catalyst's oxygen holding amount tOSC_1 (=70%). By so doing, the estimated catalyst's oxygen holding amount eOSC reaches the first target catalyst's oxygen holding amount tOSC_1 at the timing of t2. Next, the estimated catalyst's oxygen holding amount eOSC decreases toward the second target catalyst's oxygen holding amount tOSC_2 (=15%); and then, the estimated catalyst's oxygen holding amount eOSC reaches the second target catalyst's oxygen holding amount tOSC_2 at the timing of t3. When the rich judgment is made at the timing of t4, in order to restart the control with the initial target air fuel ratio of 14.88, at the timing of t4 the estimated catalyst's oxygen holding amount eOSC is set at 0% again as the initial setting.

This control of the air fuel ratio by the engine controller 11 will be explained by following the flow charts of FIG. 4A, FIG. 4B, and FIG. 5.

Figure 4A:
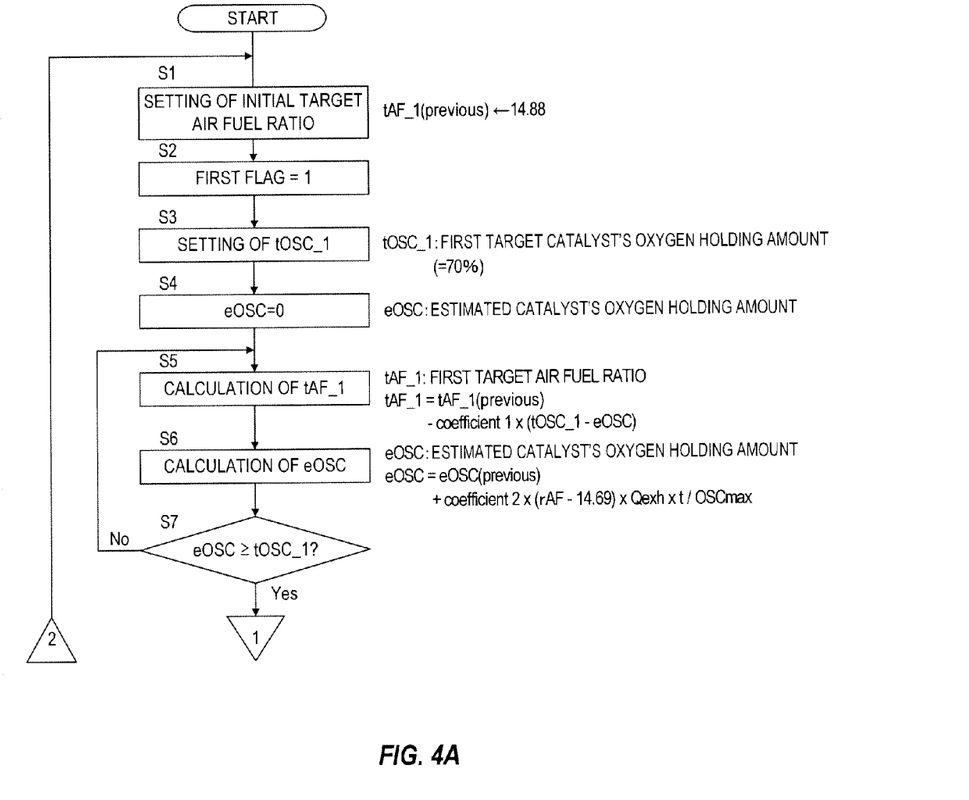
FIG. 4A is a flow chart to explain the way how to calculate the target air fuel ratio and the estimated catalyst's oxygen holding amount.
Figure 4B:
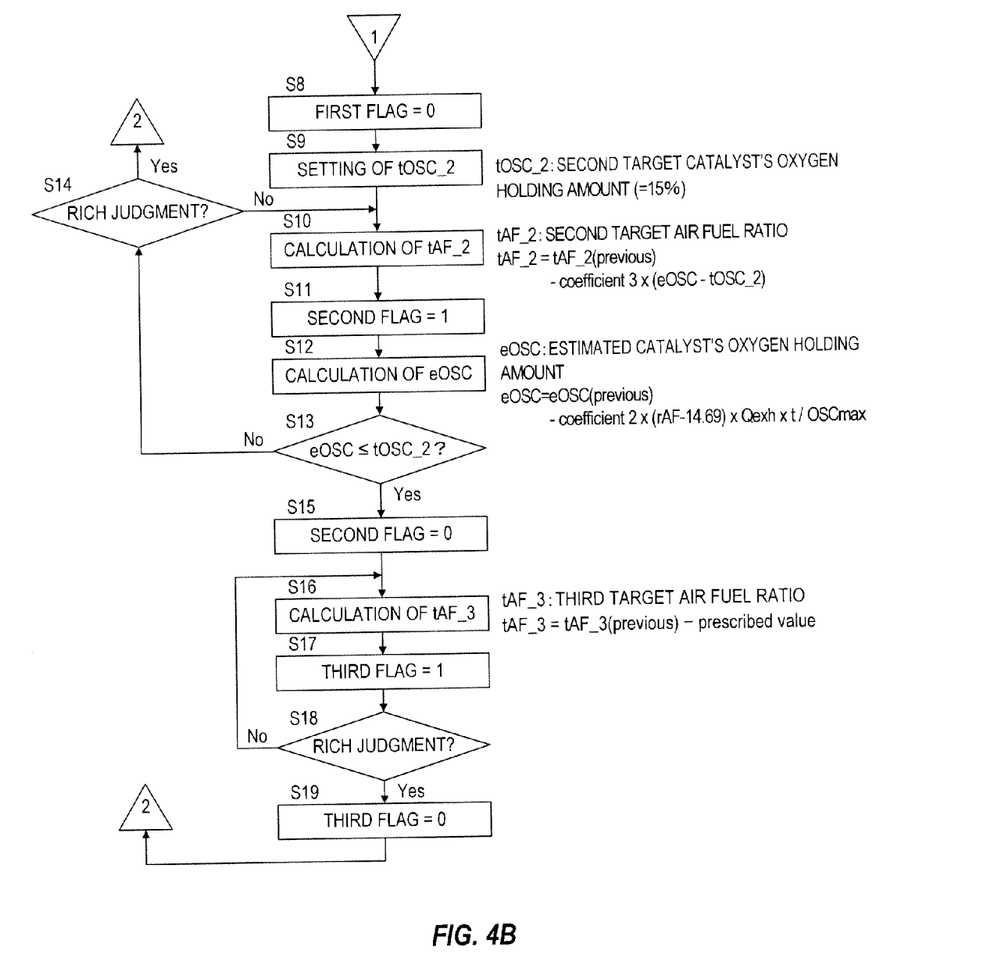
FIG. 4B is a flow chart to explain the way how to calculate the target air fuel ratio and the estimated catalyst's oxygen holding amount.

The flow charts of FIG. 4A and FIG. 4B are for calculating the target air fuel ratio and the estimated catalyst's oxygen holding amount. The flow charts of FIG. 4A and FIG. 4B are to show the procedures; and these are not for execution at every constant interval (for example, in every 10 ms). The flow charts of FIG. 4A and FIG. 4B are based on the assumption that the situation is in the feedback control region of the air fuel ratio. Here, the condition of the feedback control region of the air fuel ratio is fulfilled by activating the front air fuel ratio sensor 17 and the catalyst 6. The rear O2 sensor 18 needs to be activated, too; however, because the rear O2 sensor 18 is located in the downstream side of the catalyst 6, it is thought that the rear O2 sensor 18 is also activated at the timing when activation of the catalyst 6 is completed.

In FIG. 4A, the step S1 to the step S7 show the calculation parts of the target air fuel ratio (first target air fuel ratio) and the estimated catalyst's oxygen holding amount (first estimated catalyst's oxygen holding amount) from Point A to Point C of FIG. 2. Firstly, in the step S1, after judgment is made in the rich side based on the output of the rear O2 sensor, the initial target air fuel ratio of 14.88 is set. The first target air fuel ratio $tAF\_1$ is the value which becomes gradually smaller from the initial target air fuel ratio of 14.88 to the theoretical air fuel ratio of 14.69, so that 14.88 is put in $tAF\_1$ (previous), which is the previous value of the first target air fuel ratio.

In the step S2, the first flag (initially set to zero at the starting time of the engine 1)=1 is set. The first flag=1 shows that the initial target air fuel ratio of 14.88 is set.

In the step S3, the first target catalyst's oxygen holding amount $tOSC\_1$ is set at 70%. This amount of 70% is, as shown above, the maximum value of the catalyst's oxygen holding amount with which conversion rate of NOx can be kept at 100% with the initial target air fuel ratio of 14.88. The first target catalyst's oxygen holding amount $tOSC\_1$ is not limited to 70%; and thus, it may be a value (prescribed value) less than 70%.

In the step S4, the estimated catalyst's oxygen holding amount eOSC is set at 0%. The estimated catalyst's oxygen holding amount eOSC is calculated as a value for the present cycle which is obtained basically by counting to the previous value the increasing or decreasing amount of the catalyst's holding amount per the calculation cycle time. In the operation of the step S4, at the time of starting the control of the air fuel ratio of one cycle, the estimated catalyst's oxygen holding amount eOSC is initialized at 0%. This means that the estimated catalyst's oxygen holding amount eOSC is corrected by resetting the estimated catalyst's oxygen holding amount eOSC at 0% at the timing when the output of the rear O2 sensor is judged to be rich.

In the step S5, the first target air fuel ratio $tAF\_1$ is calculated by the following equation.

$$tAF\_1 = tAF\_1(\text{previous}) - \text{coefficient } 1 \times (tOSC\_1 - eOSC) \quad (4)$$

Here,
$tAF\_1$ (previous): previous value of $tAF\_1$
$tOSC\_1$: first target catalyst's oxygen holding amount
coefficient 1: coefficient (positive number) with which the catalyst's oxygen holding amount is converted to the air fuel ratio By the equation (4), the air fuel ratio directing toward a richer side from the initial target air fuel ratio of 14.88 to the theoretical air fuel ratio of 14.69 so as to coincide the estimated catalyst's oxygen holding amount eOSC with the first target catalyst's oxygen holding amount $tOSC\_1$ is calculated as the first target air fuel ratio $tAF\_1$. At first, these values are as following, $tAF\_1$ (previous)=14.88, $tOSC\_1$=70%, and eOSC=0%, so that the equation (4) can be expressed as follows.

$$tAF\_1 = 14.88 - \text{coefficient } 1 \times 70\% \quad (5)$$

That is, the first target air fuel ratio $tAF\_1$ in the left-hand side of the equation (5) becomes smaller than the initial target air fuel ratio of 14.88 by the second member of the right-hand side of the equation (5).

In the step S6, the estimated catalyst's oxygen holding amount eOSC (first estimated catalyst's oxygen holding amount) is calculated by the following equation.

$$eOSC = eOSC(\text{previous}) + \text{coefficient } 2 \times (rAF - 14.69) \times Qexh \times t / OSCmax \quad (6)$$

Here,
eOSC (previous): previous value of eOSC
14.69: theoretical air fuel ratio
rAF: air fuel ratio detected by the front air fuel ratio sensor 17
Qexh: flow amount of the exhaust gas (cc/s)
t: calculation cycle time (s)
OSCmax: maximum catalyst's oxygen holding amount (g)
coefficient 2: coefficient (positive number) with which the air fuel ratio is converted to the oxygen concentration (g/cc)

During the course from Point A to Point C in FIG. 2, the air fuel ratio at the catalyst's inlet port is in the lean side of the theoretical air fuel ratio, so that the air fuel ratio rAF at the catalyst's inlet port that is detected by the front air fuel ratio sensor 17 is larger than the theoretical air fuel ratio of 14.69; and thus, the second member of the right-hand side of the equation (6) becomes plus.

The second member of the right-hand side of the equation (6) is the value, in which a value obtained by multiplying the difference between the air fuel ratio rAF and the theoretical air fuel ratio of 14.69 by the flow amount of the exhaust gas Qexh and by the calculation cycle time t thereby converting to the oxygen amount (g), followed by dividing this value by the maximum catalyst's oxygen holding amount (g), that is, this is the increased amount of the catalyst's oxygen holding amount % per the calculation cycle time. The value obtained by adding this increased amount of the catalyst's oxygen holding amount % per the calculation cycle time is the estimated catalyst's oxygen holding amount eOSC.

The flow amount of the exhaust gas Qexh in the equation (6) may be detected, but Qexh may be substituted by the intake air flow amount Qa that is detected by the air flow meter 13. The same is applied to the later-mentioned equation (10).

Because at first eOSC (previous) is 0%, the equation (6) can be expressed as follows.

$$eOSC = \text{coefficient } 2 \times (rAF - 14.69) \times Qexh \times t / OSCmax \quad (7)$$

From the equation (7), a positive value is calculated as the estimated catalyst's oxygen holding amount eOSC.

In the step S7, the estimated catalyst's oxygen holding amount eOSC which is calculated as mentioned above is compared with the first target catalyst's oxygen holding amount $tOSC\_1$ (=70%). At first, the estimated catalyst's oxygen holding amount eOSC is smaller than the first target catalyst's oxygen holding amount tOSC_1 thereby returning to the step S5, and then the operations of steps S5 and S6 are executed. That is, during the time when the estimated catalyst's oxygen holding amount eOSC is smaller than the first target catalyst's oxygen holding amount tOSC_1, the operations of steps S5 and S6 are repeated. By repeating the equation (4), the first target air fuel ratio tAF_1 becomes smaller toward the theoretical air fuel ratio of 14.69; and by repeating the equation (7), the estimated catalyst's oxygen holding amount eOSC becomes larger as a positive value toward the first target catalyst's oxygen holding amount tOSC_1 (=70%).

In the due course, the estimated catalyst's oxygen holding amount eOSC reaches the first target catalyst's oxygen holding amount tOSC_1 (=70%). At this time, the operation proceeds to the step S8 of FIG. 4B from the step S7.

In FIG. 4B, the step S8 to the step S14 show the calculation parts of the target air fuel ratio (second target air fuel ratio) and the estimated catalyst's oxygen holding amount (second estimated catalyst's oxygen holding amount) from Point C to Point F in FIG. 2. In the step S8, the first flag=0 is set to terminate the calculation of the first target air fuel ratio tAF_1.

In the step S9, the second target catalyst's oxygen holding amount tOSC_2 is set at 15%. This amount of 15% is, as shown above, the minimum value of the catalyst's oxygen holding amount with which conversion rates of HC and CO can be kept at 100% with the final target air fuel ratio of 14.50. The second target catalyst's oxygen holding amount tOSC_2 is not limited to 15%; and thus, it may be a value (prescribed value) more than 15%.

In the step S10, the second target air fuel ratio tAF_2 is calculated by the following equation.

$$tAF\_2 = tAF\_2(\text{previous}) - \text{coefficient } 3 \times (eOSC - tOSC\_2) \quad (8)$$

Here,
tAF_2 (previous): previous value of tAF_2
tOSC_2: second target catalyst's oxygen holding amount
coefficient 3: coefficient (positive number) with which the catalyst's oxygen holding amount is converted to the air fuel ratio By the equation (8), the air fuel ratio directing toward a richer side from the theoretical air fuel ratio of 14.69 to the final target air fuel ratio of 14.50 so as to coincide the estimated catalyst's oxygen holding amount eOSC with the second target catalyst's oxygen holding amount tSC_2 is calculated as the second target air fuel ratio tAF_2. At first, these values are as following, eOSC=70% and tOSC_2=15%, so that the equation (8) can be expressed as follows.

$$tAF\_2 = 14.69 - \text{coefficient } 3 \times (70 - 15)\% \quad (9)$$

That is, the second target air fuel ratio tAF_2 in the left-hand side of the equation (9) becomes smaller than the previous value by the second member of the right-hand side of the equation (9).

In the step S11, the second flag (initially set to zero at the starting time of the engine)=1 is set. The second flag=1 shows that the second target air fuel ratio tAF_2 has been calculated.

In the step S12, the estimated catalyst's oxygen holding amount eOSC (second estimated catalyst's oxygen holding amount) is calculated by the afore-mentioned equation (6).

$$eOSC = eOSC(\text{previous}) + \text{coefficient } 2 \times (rAF - 14.69) \times Qexh \times t / OSC\max \quad (10)$$

During the course from Point C to Point F in FIG. 2, the air fuel ratio at the catalyst's inlet port is in the rich side of the theoretical air fuel ratio, so that the air fuel ratio rAF at the catalyst's inlet port that is detected by the front air fuel ratio sensor 17 is smaller than the theoretical air fuel ratio of 14.69; and thus, the second member of the right-hand side of the equation (6) becomes minus.

The second member of the right-hand side of the equation (6) is the value, in which a value obtained by multiplying the difference between the air fuel ratio rAF and the theoretical air fuel ratio of 14.69 by the flow amount of the exhaust gas Qexh and by the calculation cycle time t thereby converting to the oxygen amount (g), followed by dividing this value by the maximum catalyst's oxygen holding amount (g), that is, this is the decreased amount (minus value) of the catalyst's oxygen holding amount % per the calculation cycle time. The value obtained by counting this decreased amount (minus value) of the catalyst's oxygen holding amount % per the calculation cycle time is the estimated catalyst's oxygen holding amount eOSC.

Because at first eOSC (previous) is 70%, the equation (6) can be expressed as follows.

$$eOSC = 70 - \text{coefficient } 2 \times (rAF - 14.69) \times Qexh \times t / OSC\max \quad (10)$$

Here, because rAF is the value which is near to the theoretical air fuel ratio of 14.69, from the equation (10), a positive value which is smaller than 70% is calculated as the estimated catalyst's oxygen holding amount eOSC.

In the step S13, the estimated catalyst's oxygen holding amount eOSC which is calculated as mentioned above is compared with the second target catalyst's oxygen holding amount tOSC_2 (=15%). At first, the estimated catalyst's oxygen holding amount eOSC is larger than the second target catalyst's oxygen holding amount tOSC_2 thereby going to the step S14, and then whether the rich judgment is made or not is checked based on the output of the rear O2 sensor. For example, if the air fuel ratio at the outlet port of the catalyst 6 (air fuel ratio of the exhaust gas) is in the rich side of the theoretical air fuel ratio of 14.69, the output of the rear O2 sensor becomes a value near to 1.0 V; on the other hand, if the air fuel ratio at the outlet port of the catalyst 6 is in the lean side of the theoretical air fuel ratio of 14.69, the output of the rear O2 sensor becomes a value near to 0 V. Therefore, the slice level is set at near 500 mV; and when the output of the rear O2 sensor is less than this slice level, the air fuel ratio at the outlet port of the catalyst 6 can be judged in the lean side of the theoretical air fuel ratio of 14.69. Further, when the output of the rear O2 sensor passes over the slice level thereby becoming more than this slice level, the air fuel ratio at the outlet port of the catalyst 6 can be judged in the rich side of the theoretical air fuel ratio of 14.69.

When the judgment in the step 14 is not in the rich side, the operation returns to the step S10, and then the operations of steps S10, S11, and S12 are executed. That is, during the time when the rich judgment is not made and the estimated catalyst's oxygen holding amount eOSC is larger than the second target catalyst's oxygen holding amount tOSC_2, the operations of steps S10, S11, and S12 are repeated. By repeating the equation (8), the second target air fuel ratio tAF_2 becomes smaller toward the final target air fuel ratio of 14.50; and by repeating the equation (6), the estimated catalyst's oxygen holding amount eOSC becomes smaller as the positive value toward the second target catalyst's oxygen holding amount tOSC_1 (=15%).

In the due course, the estimated catalyst's oxygen holding amount eOSC reaches the second target catalyst's oxygen holding amount tOSC_2 (=15%). At this time, the operation proceeds from the step S13 to the steps that follow the step S15.

On the other hand, when the judgment in the step S14 is made in the rich side, the operation returns to the step S1.

The step S15 to the step S18 show the calculation parts of the target air fuel ratio (third target air fuel ratio) from Point F to Point H in FIG. 2.

In the step S15, the second flag=0 is set to terminate the calculation of the second target air fuel ratio tAF_2.

In the step S16, the third target air fuel ratio tAF_3 is calculated by the following equation.

$$tAF\_3 = tAF\_3(\text{previous}) - \text{prescribed value} \quad (11)$$

Here, tAF_3 (previous): previous value of tAF_3 prescribed value: constant value (positive number)

The initial value of the tAF_3 (previous) in the right-hand side of the equation (11) is the final target air fuel ratio of 14.50; and thus, the equation (11) calculates, as the third target air fuel ratio, the value which is smaller (namely, toward a richer side) than the final target air fuel ratio of 14.50 by the prescribed value per the calculation cycle time. The prescribed value in the right-hand side of the equation (11) is set so as to let the third target air fuel ratio tAF_3 change at a faster rate than the rates of the first target air fuel ratio tAF_1 and the second target air fuel ratio tAF_2. The reason for this is as follows. That is, when the third target air fuel ratio tAF_3 is calculated, the operation point passes through the hatched region in the lower left of FIG. 2. The hatched region in the lower left of FIG. 2 is the region in which the catalyst's purification performance in oxidation of HC and CO is deteriorated. Therefore, when the operation point passes through the region in which the purification performance of the catalyst 6 in oxidation of HC and CO is deteriorated, in order to shorten the residence time in the region in which the purification performance of the catalyst 6 in oxidation of HC and CO is deteriorated, the changing rate of the air fuel ratio is accelerated.

In the step S17, the third flag=1 is set. The third flag=1 shows that the third target air fuel ratio tAF_3 has been calculated.

In the step S18, whether the air fuel ratio at the outlet port of the catalyst 6 is in the rich side or not is checked based on the output of the rear O2 sensor. When the air fuel ratio at the outlet port of the catalyst 6 is not judged in the rich side, the operation returns to the step S16, and then the operations of steps S16 and S17 are repeated.

By the operation of the step S16, namely by repeat of the equation (11) the third target air fuel ratio tAF_3 moves toward a richer side. In due course, when the air fuel ratio at the outlet port of the catalyst 6 is judged in the rich side in the step S18, the first cycle is judged to be completed thereby returning to the step S1 of FIG. 4A in order to execute the second cycle.

Figure 5:
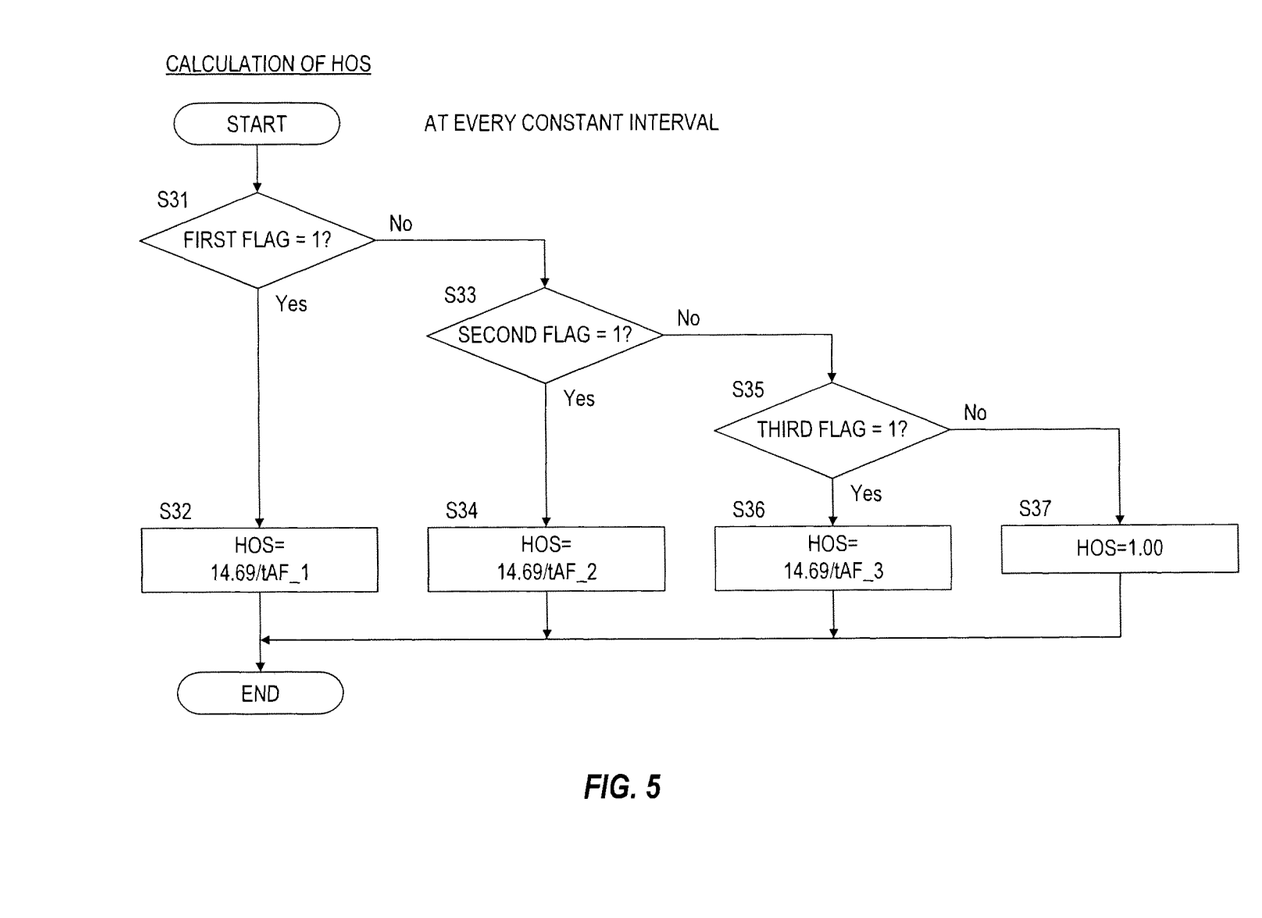
FIG. 5 is a flow chart to explain the way how to calculate the air fuel ratio correcting coefficient.

The flow chart of FIG. 5 is to calculate the air fuel correction coefficient HOS which is used in the afore-mentioned equation (3); and this is executed at every constant interval (for example, in every 10 ms).

In the step S31, the first flag is checked (this has been already set in the step S2 of FIG. 4A). In the case of the first flag=1, the initial target air fuel ratio of 14.88 is set; and thereafter, the first target air fuel ratio tAF_1 directing toward a smaller side (richer side) thereof by taking the initial target air fuel ratio as the initial value is calculated. In this case, the operation proceeds to the step S32, wherein the air fuel ratio correction coefficient HOS (dimensionless quantity) is calculated by dividing the theoretical air fuel ratio of 14.69 by the first target air fuel ratio tAF_1 (this has already been calculated in the step S5 of FIG. 4A), namely, by the following equation.

$$HOS = 14.69/tAF\_1 \quad (12)$$

Because the first air fuel ratio tAF_1 is a larger value than the theoretical air fuel ratio of 14.69, the air fuel ratio correction coefficient HOS is a smaller value than 1.0 from the equation (12). In other words, when the first target air fuel ratio tAF_1 is calculated, the pulse width Tp which corresponds to the cylinder air amount (fuel injection amount) is corrected to be smaller by the air fuel ratio correction coefficient HOS of the equation (12), whereby the air fuel ratio of the air-fuel mixture moves toward a smaller side from the initial target air fuel ratio of 14.88 to the theoretical air fuel ratio of 14.69.

In the step S31, in the case of the first flag=0, the operation proceeds to the step S33, and then the second flag (this has been already set in the step S11 of FIG. 4B) is checked. In the case of the second flag=1, the second target air fuel ratio tAF_2 directing toward a smaller side (richer side) from the theoretical air fuel ratio of 14.69 to the final target air fuel ratio of 14.50 is calculated, as having been already mentioned in FIG. 4B. Therefore, in this case, the operation proceeds to the step S34, wherein the air fuel ratio correction coefficient HOS (dimensionless quantity) is calculated by dividing the theoretical air fuel ratio 14.69 by the second target air fuel ratio tAF_2 (this has already been calculated in the step S10 of FIG. 4B), namely, by the following equation.

$$HOS = 14.69/tAF\_2 \quad (13)$$

Because the second air fuel ratio tAF_2 is a smaller value than the theoretical air fuel ratio of 14.69, the air fuel ratio correction coefficient HOS is a larger value than 1.0 from the equation (13). In other words, when the second target air fuel ratio tAF_2 is calculated, the pulse width Tp (fuel injection amount), which corresponds to the cylinder air amount, is corrected to be larger by the air fuel ratio correction coefficient HOS of the equation (13), whereby the air fuel ratio of the air-fuel mixture moves toward a smaller side from the theoretical air fuel ratio of 14.69 to the final target air fuel ratio of 14.50.

In the step S33, in the case of the second flag=0, the operation proceeds to the step S35, and then the third flag (this has been already set in the step S17 of FIG. 4B) is checked. In the case of the third flag=1, the third target air fuel ratio tAF_3 directing toward a smaller side (a richer side) with the final target air fuel ratio of 14.50 as the initial value is calculated, as having been already mentioned in FIG. 4B. Therefore, in this case, the operation proceeds to the step S36, wherein the air fuel ratio correction coefficient HOS (dimensionless quantity) is calculated by dividing the theoretical air fuel ratio 14.69 by the third target air fuel ratio tAF_3 (this has already been calculated in the step S16 of FIG. 4B), namely, by the following equation.

$$HOS = 14.69/tAF\_3 \quad (14)$$

Because the third air fuel ratio tAF_3 is a smaller value than the theoretical air fuel ratio of 14.69, the air fuel ratio correction coefficient HOS is a larger value than 1.0 from the equation (14). In other words, when the third target air fuel ratio tAF_3 is calculated, the pulse width Tp (fuel injection amount) which corresponds to the cylinder air amount is corrected to be larger by the air fuel ratio correction coefficient HOS of the equation (14), whereby the air fuel ratio of the air-fuel mixture moves toward a further smaller side (richer side) than the final target air fuel ratio of 14.50.

In the step S35, in the case of the third flag=0, the rich judgment is made by the output of the rear O2 sensor. In this case, the operation proceeds to the step S37, wherein the air fuel ratio correction coefficient HOS of 1.00 is set. With this, the operation enters to the next cycle, whereby waiting for the first flag=1. When it becomes the first flag=1, the operations from the step S31 are repeated.

The air fuel ratio correction coefficient HOS that is calculated from FIG. 5 is used in the afore-mentioned equation (3).

Here, the effects of the action of the present embodiment will be explained.

The purification apparatus of an exhaust gas of an engine in the present embodiment includes the catalyst 6 having an oxygen holding capacity with which an oxygen in the exhaust gas discharged from the engine 1 is held and released in accordance with the air fuel ratio in the exhaust gas, the front air fuel ratio sensor 17, and the rear O2 sensor 18.

In this apparatus, when the rear O2 sensor 18 judges the richer side than the theoretical air fuel ratio, a value (14.88) in the lean side of the theoretical air fuel ratio of 14.69 is taken as the initial target air fuel ratio, whereby the first target air fuel ratio tAF_1 directing toward a richer side from the initial target air fuel ratio of 14.88 to the theoretical air fuel ratio of 14.69 is calculated based on the first target catalyst's oxygen holding amount tOSC_1 and the estimated catalyst's oxygen holding amount eOSC (first estimated catalyst's oxygen holding amount) (see the step S5 of FIG. 4A). A fuel supply amount to the engine 1 is corrected so as to obtain the first target air fuel ratio tAF_1 (see the steps S31 and S32 of FIG. 5, as well as equation (12) and equation (3)). Based on the air fuel ratio rAF that is detected by the front air fuel ratio sensor 17 and the theoretical air fuel ratio of 14.69, the estimated catalyst's oxygen holding amount eOSC (first estimated catalyst's oxygen holding amount) is calculated (see the step S6 of FIG. 4A). Until the estimated catalyst's oxygen holding amount eOSC (first estimated catalyst's oxygen holding amount) reaches the first target catalyst's oxygen holding amount tOSC_1, calculations of the first target air fuel ratio tAF_1 and of the estimated catalyst's oxygen holding amount eOSC (first estimated catalyst's oxygen holding amount) are continued (see the steps S7, S5, and S6 of FIG. 4A). After the estimated catalyst's oxygen holding amount eOSC (first estimated catalyst's oxygen holding amount) reaches the first target catalyst's oxygen holding amount tOSC_1, by taking the value (14.50) which is in the rich side of the theoretical air fuel ratio 14.69 as the final target air fuel ratio, the second target air fuel ratio tAF_2 directing toward a richer side from the theoretical air fuel ratio of 14.69 to this final target air fuel ratio of 14.50 is calculated based on the second target catalyst's oxygen holding amount tOSC_2 and the estimated catalyst's oxygen holding amount eOSC (second estimated catalyst's oxygen holding amount) (see the step S7 of FIG. 4A and the step S10 of FIG. 4B). A fuel supply amount to the engine 1 is corrected so as to obtain the second target air fuel ratio tAF_2 (see the steps S33 and S34 of FIG. 5, as well as equation (13) and equation (3)). After the estimated catalyst's oxygen holding amount eOSC (first estimated catalyst's oxygen holding amount) reaches the first target catalyst's oxygen holding amount tOSC_1, the estimated catalyst's oxygen holding amount eOSC (second estimated catalyst's oxygen holding amount) is calculated based on the theoretical air fuel ratio of 14.69 and the air fuel ratio rAF that is detected by the front air fuel ratio sensor 17 (see the step S12 of FIG. 4B). Until the estimated catalyst's oxygen holding amount eOSC (second estimated catalyst's oxygen holding amount) reaches the second target catalyst's oxygen holding amount tOSC_2, calculations of the second target air fuel ratio and of the estimated catalyst's oxygen holding amount eOSC (second estimated catalyst's oxygen holding amount) are continued (see the steps S13, S10, and S12 of FIG. 4B).

According to the present embodiment, by taking the value (14.88) which is in the lean side of the theoretical air fuel ratio of 14.69 as the initial target air fuel ratio and the value (14.50) which is in the rich side of the theoretical air fuel ratio of 14.69 as the final target air fuel ratio, the air fuel ratio is moved from the initial target air fuel ratio of 14.88 to the theoretical air fuel ratio of 14.69, and then from the theoretical air fuel ratio of 14.69 to the final target air fuel ratio of 14.50, and also the estimated catalyst's oxygen holding amount eOSC (first estimated catalyst's oxygen holding amount) directing toward the first target catalyst's oxygen holding amount tOSC_1 is calculated, and further the estimated catalyst's oxygen holding amount eOSC (second estimated catalyst's oxygen holding amount) directing toward the second target catalyst's oxygen holding amount tOSC_2 is calculated; and thus, the air fuel ratio can be controlled more surely in the region in which the purification performance of the catalyst 6 as to the exhaust gas is not deteriorated as compared with the case that the target air fuel ratio is calculated by setting the target catalyst's oxygen holding amount at ½ of the maximum catalyst's oxygen holding amount and the minimum catalyst's oxygen holding amount.

According to the present embodiment, the first target catalyst's oxygen holding amount tOSC_1 is set at the catalyst's oxygen holding amount with which conversion rate of NOx becomes a prescribed value at the initial target air fuel ratio of 14.88; and thus, the operation can be done in the region in which conversion rate of NOx is in the prescribed value.

According to the present embodiment, the above-mentioned prescribed value is 100%; and thus, the operation in the region in which conversion rate of NOx is less than 100% (hatched region in the upper right of FIG. 2) can be avoided without fail.

According to the present embodiment, because the first target catalyst's oxygen holding amount tOSC_1 is 70% (maximum value with which conversion rate of NOx can be kept at 100%) at the initial target air fuel ratio of 14.88, the length of the control cycle, in which the operation is done from the lean air fuel ratio, to the theoretical air fuel ratio, and then to the rich air fuel ratio, can be made longer as compared with the case in which the first target catalyst's oxygen holding amount tOSC_1 is set at a value less than 70%.

According to the present embodiment, the second target catalyst's oxygen holding amount tOSC_2 is set at the catalyst's oxygen holding amount with which conversion rates of HC and CO may become the prescribed value at the final target air fuel ratio of 14.50 (air fuel ratio obtained by subtracting the difference between the initial target air fuel ratio of 14.88 and the theoretical air fuel ratio of 14.69 from the theoretical air fuel ratio of 14.69); and thus, the operation can be done in the region in which conversion rates of HC and CO are in the prescribed value.

According to the present embodiment, because the above-mentioned prescribed value is 100%, the operation can be done in the region in which conversion rates of HC and CO are 100%.

According to the present embodiment, when the air fuel ratio is the air fuel ratio obtained by subtracting the difference between the initial target air fuel ratio of 14.88 and the theoretical air fuel ratio of 14.69 from the theoretical air fuel ratio of 14.69 (namely, the air fuel ratio of 14.50), the second target catalyst's oxygen holding amount tOSC_2 is 15% (minimum value with which conversion rates of HC and CO can be kept at 100%); and thus, the length of the control cycle, in which the operation is done from the lean air fuel ratio, to the theoretical air fuel ratio, and then to the rich air fuel ratio, can be made longer as compared with the case in which the second target catalyst's oxygen holding amount tOSC_2 is set at a value more than 15%.

According to the present embodiment, when the estimated catalyst's oxygen holding amount eOSC (second estimated catalyst's oxygen holding amount) reaches the second target catalyst's oxygen holding amount tOSC_2, the third target air fuel ratio tAF_3 directing toward a richer side at a prescribed changing rate is calculated (see the steps S13 and S16 of FIG. 4B), so that the judgment that the air fuel ratio at the outlet port of the catalyst 6 is in the rich side is made without fail by means of the rear O2 sensor 18; and thus, the estimated catalyst's oxygen holding amount eOSC can be corrected regularly.

When the estimated catalyst's oxygen holding amount eOSC (second estimated catalyst's oxygen holding amount) reaches the second target catalyst's oxygen holding amount tOSC_2, the air fuel ratio at the inlet port of the catalyst 6 is the final target air fuel ratio of 14.50. The region in the rich side of this final target air fuel ratio of 14.50 is the region in which the purification performance of the catalyst 6 in oxidation of HC and CO is deteriorated. According to the present embodiment, the third target air fuel ratio tAF_3 is made to change at a faster rate than the rates of the first target air fuel ratio tAF_1 and the second target air fuel ratio tAF_2; and thus, the residence time in the region in which the purification performance of the catalyst 6 in oxidation of HC and CO is deteriorated can be shortened.

In the above, embodiments of the present invention have been explained; however, these embodiments show merely a part of applications of the present invention, so that these do not mean to restrict the technical scope of the present invention to the specific composition of these embodiments. Various modifications thereof may be allowed within not deviating from the purport of the present invention.

The present application claims the priority right based on the Japanese Patent Application No. 2012-142142 filed to the Japan Patent Office on Jun. 25, 2012; and all the contents in the said application is incorporated into the present description by referring to it.

The invention claimed is:

1. A purification apparatus of an exhaust gas of an engine, comprising:
   a catalyst having an oxygen holding capacity with which oxygen in the exhaust gas discharged from the engine is held or released in accordance with an air fuel ratio in the exhaust gas,
   an upstream air fuel ratio sensor adapted to detect an air fuel ratio of the exhaust gas in an upstream side of the catalyst, and
   a downstream air fuel ratio sensor adapted to detect an air fuel ratio of the exhaust gas in a downstream side of the catalyst, and comprising further:
   an engine controller configured to:
      calculate, when the downstream air fuel ratio sensor judges a rich side of a theoretical air fuel ratio, wherein a value in a lean side of the theoretical air fuel ratio is taken as an initial target air fuel ratio, a first target air fuel ratio, which is an air fuel ratio between the initial target air fuel ratio and the theoretical air fuel ratio, directing toward a richer side from the initial target air fuel ratio to the theoretical air fuel ratio based on a first target catalyst's oxygen holding amount and a first estimated catalyst's oxygen holding amount,
      correct a fuel supply amount to the engine thereby obtaining the first target air fuel ratio,
      calculate, when a target air fuel ratio is the first target air fuel ratio, the first estimated catalyst's oxygen holding amount based on an air fuel ratio that is detected by the upstream air fuel ratio sensor and the theoretical air fuel ratio,
      continue calculation of the first target air fuel ratio and the first estimated catalyst's oxygen holding amount until the first estimated catalyst's oxygen holding amount reaches the first target catalyst's oxygen holding amount,
      calculate, after the first estimated catalyst's oxygen holding amount reaches the first target catalyst's oxygen holding amount, wherein a value in a rich side of the theoretical air fuel ratio is taken as a final target air fuel ratio, a second target air fuel ratio, which is an air fuel ratio between the theoretical air fuel ratio and the final target air fuel ratio, directing toward a richer side from the theoretical air fuel ratio to the final target air fuel ratio based on a second target catalyst's oxygen holding amount and a second estimated catalyst's oxygen holding amount,
      correct a fuel supply amount to the engine thereby obtaining the second target air fuel ratio,
      calculate, when the target air fuel ratio is the second target air fuel ratio, the second estimated catalyst's oxygen holding amount based on an air fuel ratio that is detected by the upstream air fuel ratio sensor and the theoretical air fuel ratio, and
      continue calculations of the second target air fuel ratio and of the second estimated catalyst's oxygen holding amount until the second estimated catalyst's oxygen holding amount reaches the second target catalyst's oxygen holding amount.

2. The purification apparatus of an exhaust gas of an engine according to claim 1, wherein the first target catalyst's oxygen holding amount is set at a catalyst's oxygen holding amount with which conversion rate of NOx at the initial target air fuel ratio becomes a prescribed value.

3. The purification apparatus of an exhaust gas of an engine according to claim 2, wherein the prescribed value is 100%.

4. The purification apparatus of an exhaust gas of an engine according to claim 2, wherein the first target catalyst's oxygen holding amount is a maximum value with which the conversion rate of NOx is kept at 100% at the initial target air fuel ratio.

5. The purification apparatus of an exhaust gas of an engine according to claim 1, wherein the second target catalyst's oxygen holding amount is set at a catalyst's oxygen holding amount with which conversion rates of HC and CO at an air fuel ratio obtained by subtracting a difference between the initial target air fuel ratio and the theoretical air fuel ratio from the theoretical air fuel ratio becomes a prescribed value.

6. The purification apparatus of an exhaust gas of an engine according to claim 5, wherein the prescribed value is 100%.

7. The purification apparatus of an exhaust gas of an engine according to claim 5, wherein the second target catalyst's oxygen holding amount is a minimum value with which the conversion rates of HC and CO at the air fuel ratio obtained by subtracting the difference between the initial target air fuel ratio and the theoretical air fuel ratio from the theoretical air fuel ratio can be kept at 100%.

8. The purification apparatus of an exhaust gas of an engine according to claim 1, wherein when the second estimated catalyst's oxygen holding amount reaches the second target catalyst's oxygen holding amount, a third target air fuel ratio directing toward a richer side of a final target air fuel ratio at a prescribed rate is calculated.

9. The purification apparatus of an exhaust gas of an engine according to claim 8, wherein the third target air fuel ratio is achieved at a faster rate than rates of achieving the first target air fuel ratio and the second target air fuel ratio.

10. A method for purifying an exhaust gas of an engine, which is a method for purifying an exhaust gas of an engine provided with a catalyst having an oxygen holding capacity with which an oxygen in the exhaust gas discharged from the engine is held or released in accordance with an air fuel ratio in the exhaust gas, comprising:

detecting an air fuel ratio of the exhaust gas in an upstream side, detecting an air fuel ratio of the exhaust gas in a downstream side of the catalyst,  when the air fuel ratio of the exhaust gas in the downstream side is judged to be in a rich side of a theoretical air fuel ratio, taking a value in a lean side of the theoretical air fuel ratio as an initial target air fuel ratio, and calculating a first target air fuel ratio, which is an air fuel ratio between the initial target air fuel ratio and the theoretical air fuel ratio, directing toward a richer side from the initial target air fuel ratio to the theoretical air fuel ratio based on a first target catalyst's oxygen holding amount and a first estimated catalyst's oxygen holding amount,  correcting a fuel supply amount to the engine to obtain the first target air fuel ratio,  when a target air fuel ratio is the first target air fuel ratio, calculating the first estimated catalyst's oxygen holding amount based on the air fuel ratio in the upstream side and the theoretical air fuel ratio,  until the first estimated catalyst's oxygen holding amount reaches the first target catalyst's oxygen holding amount, continuing calculations of the first target air fuel ratio and of the first estimated catalyst's oxygen holding amount,  after the first estimated catalyst's oxygen holding amount reaches the first target catalyst's oxygen holding amount, taking a value in a rich side of the theoretical air fuel ratio as a final target air fuel ratio, and calculating a second target air fuel ratio, which is an air fuel ratio between the theoretical air fuel ratio and the final target air fuel ratio, directing toward a richer side from the theoretical air fuel ratio to the final target air fuel ratio based on a second target catalyst's oxygen holding amount and a second estimated catalyst's oxygen holding amount,  correcting a fuel supply amount to the engine to obtain the second target air fuel ratio,  when the target air fuel ratio is the second target air fuel ratio, calculating the second estimated catalyst's oxygen holding amount based on the air fuel ratio of the exhaust gas in the upstream side and the theoretical air fuel ratio, and  until the second estimated catalyst's oxygen holding amount reaches the second target catalyst's oxygen holding amount, continuing calculations of the second target air fuel ratio and of the second estimated catalyst's oxygen holding amount.

11. A purification apparatus of an exhaust gas of an engine, comprising:

a catalyst having an oxygen holding capacity with which oxygen in the exhaust gas discharged from the engine is held or released in accordance with an air fuel ratio in the exhaust gas,  upstream air fuel ratio detecting means for detecting an air fuel ratio of the exhaust gas in an upstream side of the catalyst, and  downstream air fuel ratio detecting means for detecting an air fuel ratio of the exhaust gas in a downstream side of the catalyst, and comprising further:

first target air fuel ratio calculating means for calculating, when the downstream air fuel ratio detecting means judges a rich side of a theoretical air fuel ratio, wherein a value in a lean side of the theoretical air fuel ratio is taken as an initial target air fuel ratio, a first target air fuel ratio, which is an air fuel ratio between the initial target air fuel ratio and the theoretical air fuel ratio, directing toward a richer side from the initial target air fuel ratio to the theoretical air fuel ratio based on a first target catalyst's oxygen holding amount and a first estimated catalyst's oxygen holding amount,  first fuel-supply-amount-correcting means for correcting a fuel supply amount to the engine thereby obtaining the first target air fuel ratio,  first estimated catalyst's oxygen holding amount calculating means for calculating, when a target air fuel ratio is the first target air fuel ratio, the first estimated catalyst's oxygen holding amount based on an air fuel ratio that is detected by the upstream air fuel ratio detecting means and the theoretical air fuel ratio,  first calculation continuing means for continuing calculation of the first target air fuel ratio and the first estimated catalyst's oxygen holding amount until the first estimated catalyst's oxygen holding amount reaches the first target catalyst's oxygen holding amount,  second target air fuel ratio calculating means for calculating, after the first estimated catalyst's oxygen holding amount reaches the first target catalyst's oxygen holding amount, wherein a value in a rich side of the theoretical air fuel ratio is taken as a final target air fuel ratio, a second target air fuel ratio, which is an air fuel ratio between the theoretical air fuel ratio and the final target air fuel ratio, directing toward a richer side from the theoretical air fuel ratio to the final target air fuel ratio based on a second target catalyst's oxygen holding amount and a second estimated catalyst's oxygen holding amount,  second fuel-supply-amount-correcting means for correcting a fuel supply amount to the engine thereby obtaining the second target air fuel ratio,  second estimated catalyst's oxygen holding amount calculating means for calculating, when the target air fuel ratio is the second target air fuel ratio, the second estimated catalyst's oxygen holding amount based on an air fuel ratio that is detected by the upstream air fuel ratio detecting means and the theoretical air fuel ratio, and  second Calculation continuing means for continuing calculations of the second target air fuel ratio and of the second estimated catalyst's oxygen holding amount until the second estimated catalyst's oxygen holding amount reaches the second target catalyst's oxygen holding amount.

\* \* \* \* \*